(12) United States Patent
Iwagami

(10) Patent No.: US 8,254,297 B2
(45) Date of Patent: Aug. 28, 2012

(54) MOBILE COMMUNICATION SYSTEM, BASE STATION, AND TRANSMISSION POWER CONTROL METHOD USED FOR THEM

(75) Inventor: Norihiro Iwagami, Tokyo (JP)

(73) Assignee: NEC Corporation, Tokyo (JP)

( * ) Notice: Subject to any disclaimer, the term of this patent is extended or adjusted under 35 U.S.C. 154(b) by 917 days.

(21) Appl. No.: 12/301,860

(22) PCT Filed: May 21, 2007

(86) PCT No.: PCT/JP2007/000538
§ 371 (c)(1),
(2), (4) Date: Nov. 21, 2008

(87) PCT Pub. No.: WO2007/135777
PCT Pub. Date: Nov. 29, 2007

(65) Prior Publication Data
US 2010/0202332 A1    Aug. 12, 2010

(30) Foreign Application Priority Data
May 24, 2006   (JP) ................................ 2006-143468

(51) Int. Cl.
G08C 17/00   (2006.01)
(52) U.S. Cl. ...................................... 370/311
(58) Field of Classification Search .................. 370/310, 370/311, 431, 464, 465, 473; 455/39, 500, 455/507–509, 517, 522, 67.11, 68–69, 73, 455/550.1, 561, 572–574, 91, 127.1, 127.5
See application file for complete search history.

(56) References Cited

U.S. PATENT DOCUMENTS

| 2001/0023189 | A1* | 9/2001 | Kajimura ..................... 455/522 |
| 2003/0131299 | A1* | 7/2003 | Ahn et al. ..................... 714/748 |
| 2004/0132405 | A1* | 7/2004 | Kitazawa et al. ............. 455/13.4 |
| 2004/0202104 | A1* | 10/2004 | Ishii et al. ..................... 370/225 |
| 2004/0248606 | A1* | 12/2004 | Suzuki et al. ................ 455/522 |
| 2005/0009551 | A1* | 1/2005 | Tsai et al. ..................... 455/522 |
| 2005/0239491 | A1* | 10/2005 | Feder et al. .................. 455/522 |
| 2005/0250540 | A1* | 11/2005 | Ishii et al. ..................... 455/561 |
| 2006/0166690 | A1* | 7/2006 | Nishio et al. ................. 455/522 |

(Continued)

FOREIGN PATENT DOCUMENTS

| CN | 1650547 A | 8/2005 |
| JP | 2004032640 A | 1/2004 |
| JP | 2004215104 A | 7/2004 |
| JP | 2006262357 A | 9/2006 |
| WO | 03036822 A1 | 5/2003 |

OTHER PUBLICATIONS

Chinese Office Action for CN200780019070.X dated Jul. 6, 2010.
"3rd Generation Partnership Project; Technical Specification Group Radio Access Network; High Speed Downlink Packet Access (HSDPA); Overall Description, Stage 2 (Release 7)" 3GPP TS 25.308 V7.0.0 (Mar. 2006), pp. 1-26.
International Search Report for PCT/JP2007/000538 mailed Aug. 28, 2007.

* cited by examiner

Primary Examiner — Anh-Vu Ly
Assistant Examiner — Omar Ghowrwal

(57) ABSTRACT

A base station (1) receives a HS-DPCCH at a base station reception unit (22) through a base station receiving antenna (12), and the HS-DPCCH is despread and demodulated by the base station despreading unit (21). The demodulated HS-DPCCH is decoded by the base station channel decoding unit (20), and ACK/NACK/DTX is extracted at a HARQ-ACK detection unit (19) and then the HS-DPCCH is delivered to a HS-SCCH transmission power decision unit (18). The HS-SCCH transmission power decision unit (18) decides transmission power of a HS-SCCH according to the detection status of the ACK/NACK/DTX. The HS-SCCH transmission power thus decided is notified to a base station control unit (17), which notifies the same to a base station spreading/modulation unit (14), so that the decided value is applied to the HS-SCCH transmission power.

5 Claims, 6 Drawing Sheets

HS-DPCCH SUB-FRAME STRUCTURE

MOBILE COMMUNICATION SYSTEM, BASE STATION, AND TRANSMISSION POWER CONTROL METHOD USED FOR THEM

TECHNICAL FIELD

The present invention relates to a mobile communication system, a base station, and a method and program for controlling transmission power to be employed therein, and more particularly to a transmission power control of a High Speed Shared Control Channel (HS-SCCH) in a High Speed Downlink Packet Access (HSDPA) system.

BACKGROUND ART

In order to achieve high-speed downlink transmission in a Wideband Code Division Multiple Access (W-CDMA) system compliant to the 3rd Generation Partnership Project (3GPP), which is rapidly spreading recently, the HSDPA system has been proposed, and studies and developments thereof are being promoted (for example, refer to a non-patented document 1).

In the HSDPA system, the HS-SCCH and a High Speed Physical Downlink Shared Channel (HS-PDSCH) are stipulated as physical channels for downlink, through which data is transmitted from a base station to a terminal, and the HS-SCCH and the HS-PDSCH are utilized as a pair. In the HSDPA system, the HS-PDSCH transmits packet data for the HSDPA, while the HS-SCCH transmits decode information used for decoding the HS-PDSCH packet data transmitted in pair.

Meanwhile, as a physical channel for uplink through which data is transmitted from the terminal to the base station, a High Speed Dedicated Control Channel (HS-DPCCH) is stipulated. A structure of a sub-frame of the HS-DPCCH is shown in FIG. 6.

As shown in FIG. 6, the sub-frame of the HS-DPCCH includes Hybrid Automatic Repeat reQuest-ACK (HARQ-ACK) information that notifies the decoding status of the HS-PDSCH by Acknowledgement (ACK)/Negative Acknowledgement (NACK)/Discontinuous Transmission (DTX), and a Channel Quality Indicator (CQI) that indicates reception quality of the data.

Regarding the HARQ-ACK, in the case where the terminal detects the HS-SCCH addressed thereto and a CRC result of the HS-PDSCH is good, the ACK is inserted; in the case where the terminal detects the HS-SCCH addressed thereto and the CRC result of the HS-PDSCH is no good, the NACK is inserted; and in the case where the terminal has not detected the HS-SCCH addressed thereto, neither is inserted, in other words the DTX is selected.

The CQI represents numerical values of 0 to 30 indicating the reception quality at a Common Pilot Channel (CPICH) of the data transmitted from the base station to the terminal, which are mapped on the sub-frame of the HS-DPCCH. According to the 3GPP, lower CQI values indicate that the reception quality is worse, and higher CQI values indicate that the reception quality is better.

In the operation of the HSDPA system, the base station transmits, upon receipt of the HS-DPCCH transmitted from the terminal, and according to the HARQ-ACK information, a new packet in the case of ACK, or retransmits in the case of NACK, and the retransmission is also executed in the case of DTX and where the HSDPA communication has been performed to the corresponding terminal. Then the base station decides the number of codes, a Transport Block Size (TBS), and a modulation method, so as to transmit the HS-PDSCH appropriate for the reception quality based on the CQI values mapped on the HS-DPCCH transmitted from the terminal. Thus, the HS-SCCH and the HS-PDSCH are transmitted as a pair.

[Non-patented document 1] "High Speed Downlink Packet Access (HSDPA)" [3GPP TS 25.308 V7.0.0 (2006-03)]

DISCLOSURE OF THE INVENTION

As stated above, in the HSDPA system, although the number of codes, the TBS, and the modulation method are adjusted based on the reception quality of the data at the terminal, the reception quality is not reflected on the HS-SCCH, and hence the decode information is transmitted in a fixed modulation method, redundancy, and transmission power.

In the HSDPA system, accordingly, in the case where the reception quality is poor and yet the decode information is transmitted in the modulation method, redundancy, and transmission power that do not match that reception quality, the reception characteristics of the HS-SCCH is degraded, and therefore the HS-PDSCH packet data may fail to be properly decoded, which results in degraded throughput. The present invention has been accomplished in view of the foregoing problem incidental to the conventional art.

Accordingly, an object of the present invention is to minimize the foregoing problem, by providing a mobile communication system and a base station that prevent degradation in downlink throughput under different conditions in terms of the communication path quality, and a method and a program for controlling transmission power to be employed therein.

According to the present invention, there is provided a mobile communication system in which a base station transmits packet data and decode information for decoding the packet data to a terminal, and the terminal transmits decoding status of the packet data to the base station;

wherein the base station includes a detector that detects the decoding status from the terminal, and a decision unit that decides, according to a detection result, transmission power with which the decode information is to be transmitted.

According to the present invention, there is provided a base station that transmits packet data and decode information for decoding the packet data to a terminal, and receives a notice on decoding status of the packet data from the terminal, comprising:

a detector that detects the decoding status from the terminal, and a decision unit that decides, according to a detection result, transmission power with which the decode information is to be transmitted.

According to the present invention, there is provided a method of controlling transmission power, to be applied to a mobile communication system in which a base station transmits packet data and decode information for decoding the packet data to a terminal, and the terminal transmits decoding status of the packet data to the base station, comprising:

causing the base station to detect the decoding status from the terminal, and deciding transmission power with which the decode information is to be transmitted, according to a detection result.

According to the present invention, there is provided a program to be executed by a base station of a mobile communication system in which the base station transmits packet data and decode information for decoding the packet data to a terminal, and the terminal notifies decoding status of the packet data to the base station, comprising:

causing a central processing unit of the base station to detect the decoding status from the terminal and to decide, according to a detection result, transmission power with which the decode information is to be transmitted.

Thus, in the mobile communication system according to the present invention, in the case where a base station is performing a High Speed Downlink Packet Access (HSDPA) communication with a terminal, under the HSDPA system compliant to the 3rd Generation Partnership Project (3GPP), the base station confirms reception status at the High Speed Shared Control Channel (HS-SCCH) based on the Acknowledgement (ACK)/Negative Acknowledgement (NACK)/Discontinuous Transmission (DTX) inserted in the Hybrid Automatic Repeat reQuest-ACK (HARQ-ACK) of the High Speed Dedicated Control Channel (HS-DPCCH) transmitted from the terminal, and increases the transmission power of the HS-SCCH constituting a pair with the High Speed Physical Downlink Shared Channel (HS-PDSCH) which transmits, upon detecting the DTX, the packet to be retransmitted, thereby upgrading the detection probability of the HS-SCCH, and thus preventing degradation in throughput due to detection failure of the HS-SCCH.

Also, in the mobile communication system according to the present invention, the power of the HS-SCCH is controlled depending on the number of consecutive receptions of the ACK/NACK, thereby facilitating efficiently utilizing the power resource of the base station.

The present invention, configured to work as above, provides the advantageous effect that degradation in downlink throughput is prevented, under different conditions in terms of the communication path quality.

BRIEF DESCRIPTION OF THE DRAWINGS

The above and other objects, features and advantages will become more apparent through a preferred embodiment described below and accompanying drawings, in which.

BEST MODE FOR CARRYING OUT THE INVENTION

Figure 1:
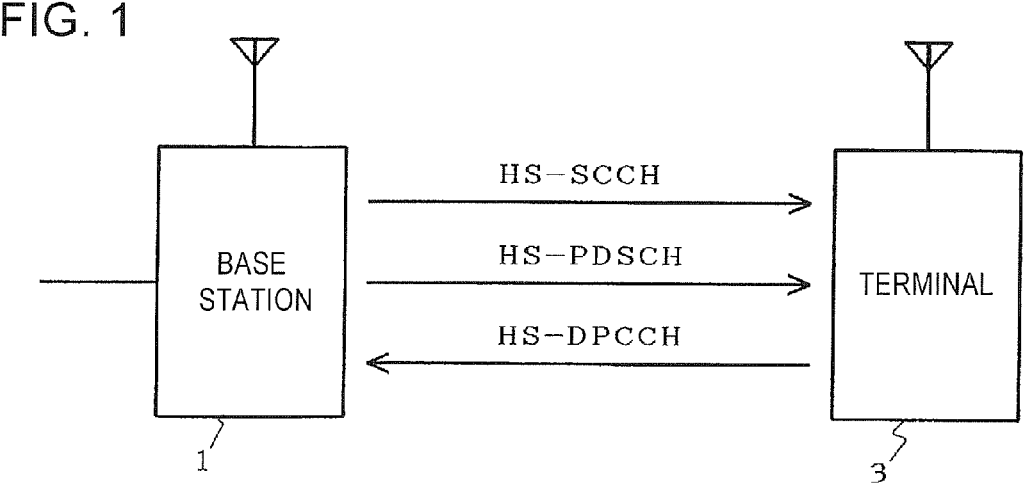
FIG. 1 is a block diagram showing a configuration of a mobile communication system according to an embodiment of the present invention.

Hereunder, embodiments of the present invention will be described referring to the drawings. FIG. 1 is a block diagram showing a configuration of a mobile communication system according to an embodiment of the present invention. In FIG. 1, the mobile communication system according to the embodiment of the present invention includes a base station 1 and a terminal 3. The base station 1 and the terminal 3 are compatible with the High Speed Downlink Packet Access (HSDPA) system.

For data transmission from the base station 1 to the terminal 3, the High Speed Physical Downlink Shared Channel (HS-PDSCH) and the High Speed Shared Control Channel (HS-SCCH) are employed. In this case, the downlink packet data for the HSDPA is transmitted through the HS-PDSCH, and decode information for decoding the HS-PDSCH packet data, being transmitted as a pair, is transmitted through the HS-SCCH.

For the data transmission from the terminal 3 to the base station 1, the High Speed Dedicated Control Channel (HS-DPCCH), which is the physical channel of the HSDPA system, is employed. In this case, the HS-DPCCH transmits the Hybrid Automatic Repeat reQuest-ACK (HARQ-ACK) information that notifies the decoding status of the HS-PDSCH, and the Channel Quality Indicator (CQI) indicating the data reception quality, i.e. the current downlink communication path quality, such that the HARQ-ACK information and the CGI are mapped on a single frame.

Figure 2:
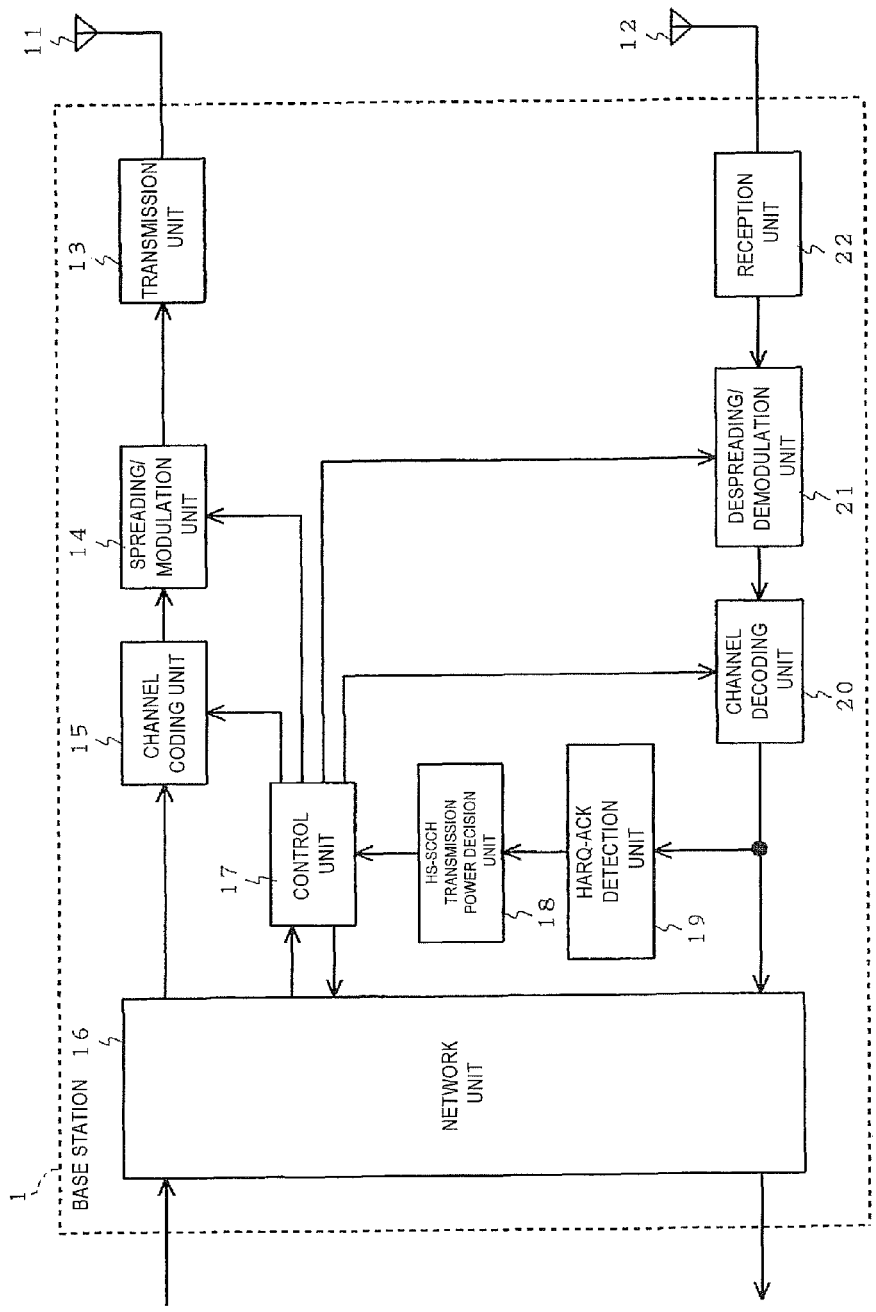
FIG. 2 is a block diagram showing an example of the structure of the base station shown in FIG. 1.

FIG. 2 is a block diagram showing an example of the structure of the base station 1 shown in FIG. 1. In FIG. 2, the base station 1 includes a base station transmitting antenna 11, a base station receiving antenna 12, a base station transmission unit 13, a base station spreading/modulation unit 14, a base station channel coding unit 15, a network unit 16, a base station control unit 17, a HS-SCCH transmission power decision unit 18, a HARQ-ACK detection unit 19, a base station channel decoding unit 20, a base station despreading/demodulation unit 21, and a base station reception unit 22.

In the base station 1, the base station channel coding unit 15 makes error correction and so on of the data to be transmitted from the network unit 16 to the terminal 3, and the data is modulated by the base station spreading/modulation unit 14 into Quadrature Phase Shift Keying (QPSK) or 16 Quadrature Amplitude Modulation (16QAM), and spread. The signal output from the base station spreading/modulation unit 14 is loaded on the at the base station transmission unit 13, to be thereby transmitted from the base station transmitting antenna 11 to the terminal 3.

On the other hand, the data transmitted from the terminal 3 to the base station 1 is received by the base station reception unit 22 through the base station receiving antenna 12. The signal received by the base station reception unit 22 is despread and demodulated by the base station despreading/demodulation unit 21, and the error correction and so on is decoded by the base station channel decoding unit 20, and the data is delivered to the network unit 16.

The HARQ-ACK detection unit 19 then detects the Acknowledgement (ACK)/Negative Acknowledgement (NACK)/Discontinuous Transmission (DTX) from the output of the base station channel decoding unit 20. The HS-SCCH transmission power decision unit 18 decides the transmission power of the HS-SCCH according to the detection status of the ACK/NACK/DTX. The base station control unit 17 serves to control the modulation and demodulation of the base station 1, the channel coding and decoding, and the network unit 16.

Figure 3:
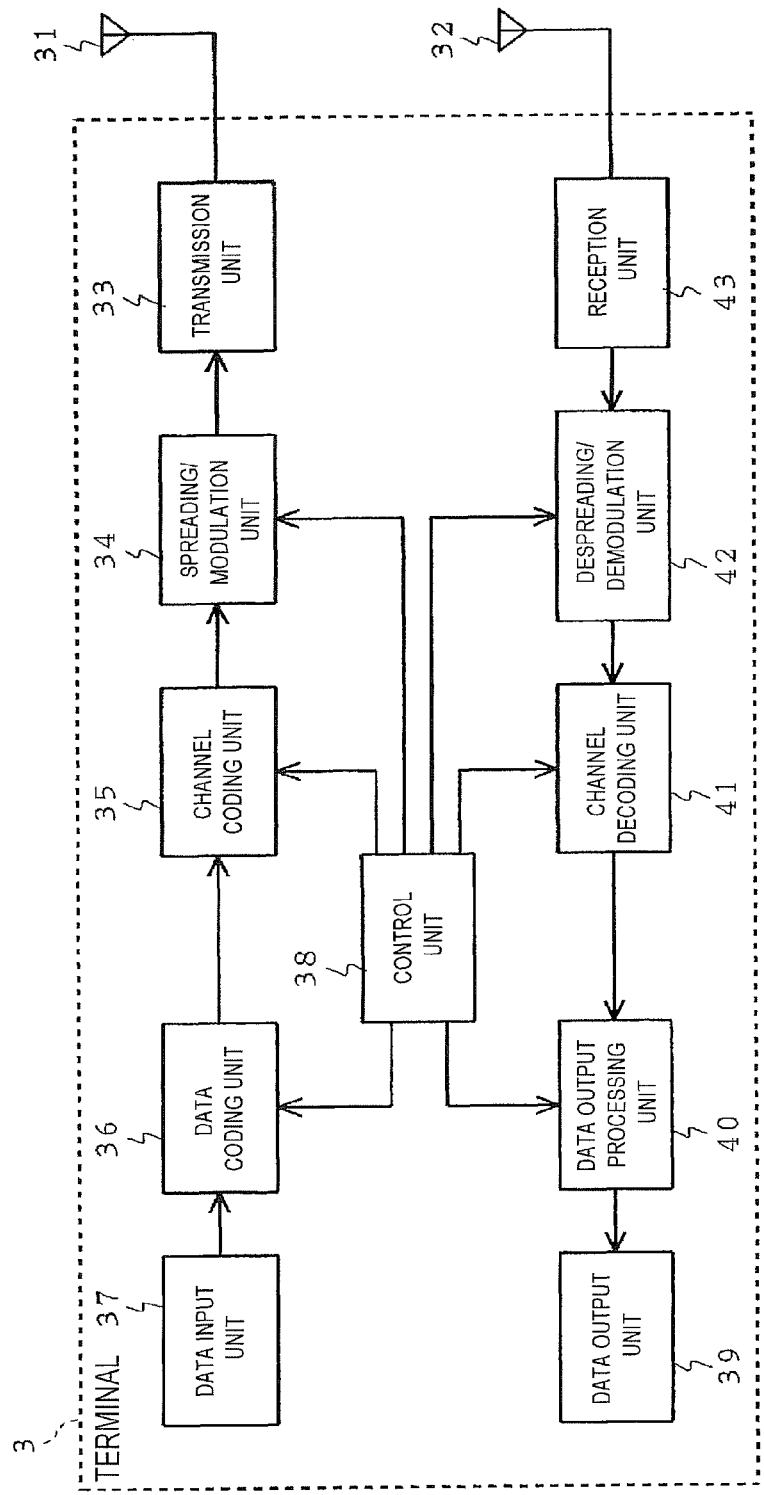
FIG. 3 is a block diagram showing an example of the structure of the terminal shown in FIG. 1.

FIG. 3 is a block diagram showing an example of the structure of the terminal 3 shown in FIG. 1. In FIG. 3, the terminal 3 includes a terminal transmitting antenna 31, a terminal receiving antenna 32, a terminal transmission unit 33, a terminal spreading/modulation unit 34, a terminal channel coding unit 35, a data coding unit 36, a data input unit 37, a terminal control unit 38, a data output unit 39, a data output processing unit 40, a terminal channel decoding unit 41, a terminal despreading/demodulation unit 42, and a terminal reception unit 43.

In the terminal 3, the signal transmitted from the base station 1 is received by the terminal reception unit 43 through the terminal receiving antenna 32. The received signal is despread and demodulated by the terminal despreading/demodulation unit 42. The demodulated signal has the error correction code and so on decoded by the terminal channel decoding unit 41, and subjected to data processing by the data output processing unit 40, to be output to the data output unit 39.

Regarding the transmission from the terminal 3, the data received through the data input unit 37 is coded by the data coding unit 36, and error correction and so on is performed at the terminal channel coding unit 35. Then the data is modulated and spread by the terminal spreading/modulation unit 34, and loaded on the carrier frequency at the terminal transmission unit 33, to be thereby transmitted from the terminal transmitting antenna 31 to the base station 1. The terminal control unit 38 serves to control the modulation and demodulation of the terminal 3, the channel coding and decoding, and the data.

Figure 4:
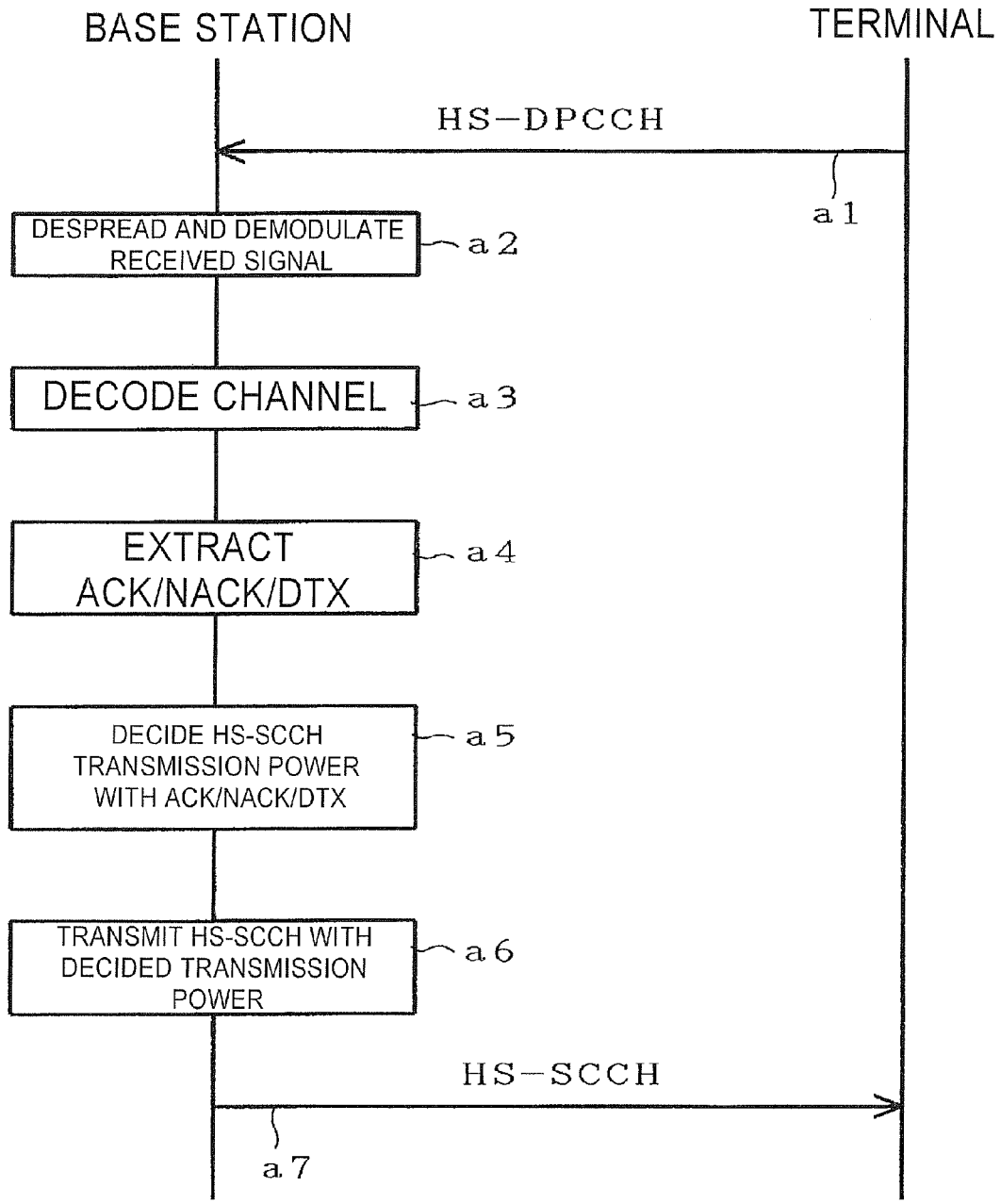
FIG. 4 is a sequence chart showing an operation of the mobile communication system according to the embodiment of the present invention.

FIG. 4 is a sequence chart showing an operation of the mobile communication system according to the embodiment of the present invention. Referring now to FIGS. 1 to 4, the operation of the mobile communication system according to the embodiment of the present invention will be described hereunder. Here, in FIG. 4, the processing operation executed by the base station 1 may be substituted with execution of a program by a Central Processing Unit (CPU) of the base station 1.

The base station 1 receives the HS-DPCCH at the base station reception unit 22 through the base station receiving antenna 12 (a1 in FIG. 4). The HS-DPCCH received at the base station reception unit 22 is despread and demodulated by the base station despreading unit 21 (a2 in FIG. 4). The HS-DPCCH despread and demodulated by the base station despreading unit 21 is decoded by the base station channel decoding unit 20 (a3 in FIG. 4), and the ACK/NACK/DTX is extracted at the HARQ-ACK detection unit 19 (a4 in FIG. 4), and then delivered to the HS-SCCH transmission power decision unit 18.

The HS-SCCH transmission power decision unit 18, which utilizes the ACK/NACK/DTX received from the HARQ-ACK detection unit 19 so as to transmit the packet for example, decides the HS-SCCH transmission power for each process, in the case where the HARQ-ACK information of the HS-DPCCH is constantly DTX, as:

(X+0.1) dB for a first retransmission
(X+0.2) dB for a second retransmission
...
(X+0.1×n) dB for an n-th retransmission, where X dB is the HS-SCCH transmission power for a brand new transmission (first transmission) of each process (a5 in FIG. 4). In this embodiment, the increment may be determined as desired, without limitation to the increment of 0.1 dB as above.

Also, the maximum number of transmissions of the HS-SCCH is stipulated as four per set by the 3GPP, and hence the HSDPA communication can be executed with four users at a time at maximum. In this embodiment, accordingly, the HS-SCCH transmission power for the relevant process may be decided as:

approx. (X+3) dB including allocation of power for two transmissions, for the first retransmission;
approx. (X+4.8) dB including allocation of power for three transmissions, for the second retransmission;
approx. (X+6) dB including allocation of power for four transmissions, for the third retransmission;

where X dB is the power for a brand new transmission (first transmission), in the case where only one user is performing the HSDPA communication. In this case, the fourth or subsequent retransmission may be executed with the same power as that of the third retransmission, or cancelled.

The HS-SCCH transmission power decided as above is notified to the base station control unit 17. The base station control unit 17 notifies the HS-SCCH transmission power received from the HS-SCCH transmission power decision unit 18, to the base station spreading/modulation unit 14, so as to apply that value to the HS-SCCH transmission power. The base station spreading/modulation unit 14 sets the HS-SCCH transmission power as notified, when executing the transmission of the HS-SCCH, and thus transmits to the terminal 3 through the base station transmission unit 13 and the base station transmitting antenna 11 (a6, a7 in FIG. 4).

As described above, in this embodiment the base station 1 detects the DTX inserted in the HARQ-ACK information of the HS-DPCCH, when executing the HSDPA communication with the terminal 3, so as to increase the transmission power of the HS-SCCH constituting a pair with the HS-PDSCH through which the packet is retransmitted, thereby improving the detection probability of the HS-SCCH. Such arrangement according to this embodiment enables minimizing the failure in decoding the HS-PDSCH due to failure in detecting the HS-SCCH, thereby upgrading the throughput.

Figure 5:
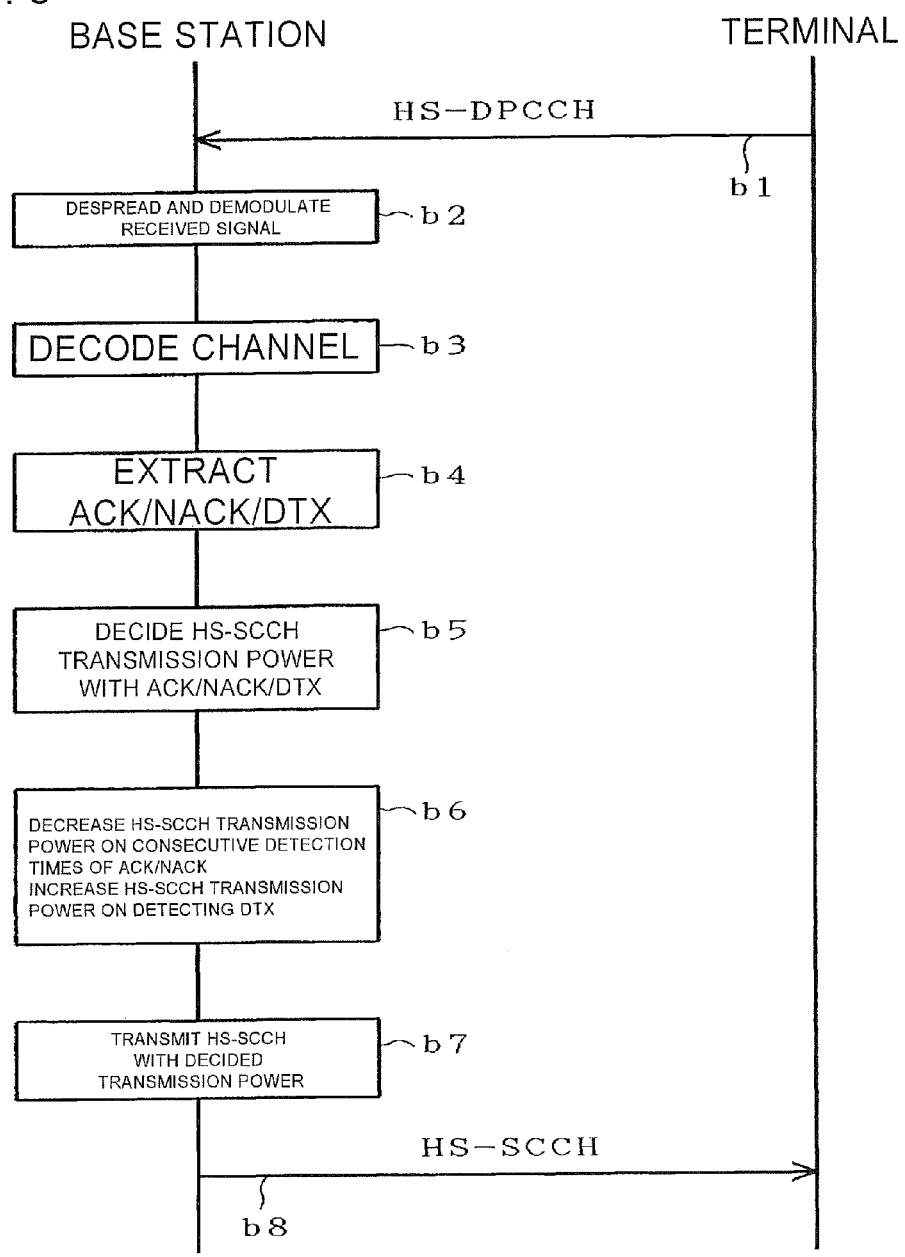
FIG. 5 is a sequence chart showing an operation of the mobile communication system according to another embodiment of the present invention.
Figure 6:
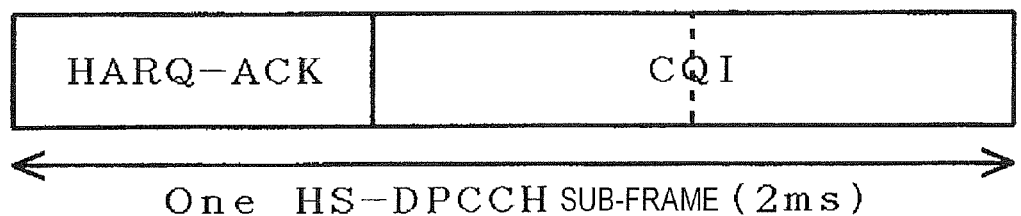
FIG. 6 is a schematic diagram showing a structure of a sub-frame of a HS-DPCCH.

FIG. 5 is a sequence chart showing an operation of the mobile communication system according to another embodiment of the present invention. The mobile communication system, the base station, and the terminal according to another embodiment of the present invention are respectively constructed similarly to the mobile communication system, the base station 1, and the terminal 3 according to the foregoing embodiment shown in FIGS. 1 to 3, and hence the operation of the mobile communication system according to the another embodiment of the present invention will be described referring to FIGS. 1 to 3, as well as to FIG. 5. Here, in FIG. 5, the processing operation executed by the base station 1 may be substituted with execution of a program by a Central Processing Unit (CPU) of the base station 1.

The base station 1 receives the HS-DPCCH at the base station reception unit 22 through the base station receiving antenna 12 (b1 in FIG. 5). The HS-DPCCH received at the base station reception unit 22 is despread and demodulated by the base station despreading unit 21 (b2 in FIG. 5). The demodulated HS-DPCCH is decoded by the base station channel decoding unit 20 (b3 in FIG. 5), and the ACK/NACK/DTX is extracted at the HARQ-ACK detection unit 19, and then delivered to the HS-SCCH transmission power decision unit 18 (b4 in FIG. 5).

The HS-SCCH transmission power decision unit 18 utilizes the ACK/NACK/DTX received from the HARQ-ACK detection unit 19, for decision of the HS-SCCH transmission power (b5 in FIG. 5). In the case where the ACK/NACK is consecutively detected, the power for the HS-SCCH may be excessively provided, and hence the HS-SCCH transmission power decision unit 18 decreases the HS-SCCH transmission power by 0.1 dB, such as:

(X−0.1) dB when the ACK/NACK has been consecutively detected n times;
(X−0.2) dB when the ACK/NACK has been consecutively detected n+m times;
(X−0.3) dB when the ACK/NACK has been consecutively detected n+m+k times;

where X dB is the current HS-SCCH transmission power. In contrast, upon detecting the DTX, the HS-SCCH transmission power is increased by 0.1 dB, and the process returns to the foregoing step (b6 in FIG. 5).

Here, the adjusting increment of the HS-SCCH transmission power may be determined as desired, without limitation to the increment of 0.1 dB as above. Also, n, m, and k are arbitrary integers, and the cases may be specified in a larger number of patterns, without limitation to the three patterns as above.

The HS-SCCH transmission power decided as above is notified to the base station control unit 17. The base station control unit 17 notifies the HS-SCCH transmission power received from the HS-SCCH transmission power decision unit 18, to the base station spreading/modulation unit 14, so as to apply that value to the HS-SCCH transmission power and deliver to the base station transmission unit 13, and then the HS-SCCH to which the decided transmission power is applied is transmitted from the base station transmission unit 13, through the base station transmitting antenna 11 (b7 in FIG. 5).

As described above, in this embodiment the base station 1 decreases, while executing the HSDPA communication with the terminal 3, the HS-SCCH transmission power upon consecutively detecting the ACK/NACK inserted in the HARQ-ACK information of the HS-DPCCH, and increases the transmission power upon detecting the DTX, thereby enabling adaptively controlling the HS-SCCH transmission power according to the communication path condition, thus achieving efficient utilization of the power resource on the side of the base station 1.

The invention claimed is:

1. A mobile communication system in which a base station transmits to a terminal packet data for HSDPA (high speed downlink packet access) through a HS-PDSCH (high speed physical downlink shared channel) and decode information for decoding said packet data of said HS-PDSCH through a HS-SCCH (high speed shared control channel), and said terminal transmits to said base station decoding status of said HS-PDSCH through a HS-DPCCH (high speed dedicated control channel) a sub-frame of said HS-DPCCH including HARQ-ACK (hybrid automatic repeat request acknowledgment) information in which said decoding status of said HS-PDSCH is indicated by ACK (acknowledgement)/NACK (negative acknowledgment)/DTX (discontinuous transmission), said base station comprising:
a detector that detects said decoding status of said HS-PDSCH from said HS-DPCCH received from said terminal; and
a decision unit that counts a number of times that said ACK/NACK inserted in said HARQ-ACK information has been consecutively detected based on a detection result of said detector, and decreases transmission power of said HS-SCCH constituting a pair with said HS-PDSCH through which said packet data is retransmitted, by an amount corresponding to the number of times that said ACK/NACK has been consecutively detected,
wherein where said ACK/NACK has been consecutively detected n times, said transmission power of said HS-SCCH is decreased by a predetermined value,
wherein where said ACK/NACK has been consecutively detected n+m times, said transmission power of said HS-SCCH is decreased by a first multiple of said predetermined value, said first multiple being greater than one,
wherein where said ACK/NACK has been consecutive detected n+m+k times, said transmission power of said HS-SCCH is decreased by a second multiple of said predetermined value, said second multiple being greater than said first multiple,
wherein where said DTX has been detected, said transmission power of said HS-SCCH is increased by said predetermined value,
and wherein where k, m, and n are positive integers, and n is greater than one.

2. A base station that transmits to a terminal packet data for HSDPA (high speed downlink packet access) through a HS-PDSCH (high speed physical downlink shared channel) and decode information for decoding said packet data of said HS-PDSCH through a HS-SCCH (high speed shared control channel), and receives decoding status of said HS-PDSCH from said terminal through a HS-DPCCH (high speed dedicated control channel), a sub-frame of said HS-DPCCH including HARQ-ACK (hybrid automatic repeat request acknowledgement) information in which said decoding status of said HS-PDSCH is indicated by ACK (acknowledgement)/NACK (negative acknowledgement)/DTX (discontinuous transmission), said base station comprising:
a detector that detects said decoding status of said HS-PDSCH from said HS-DPCCH from said terminal; and
a decision unit that counts a number of times that said ACK/NACK inserted in said HARQ-ACK information has been consecutively detected based on a detection result of said detector, and decreases transmission power of said HS-SCCH constituting a pair with said HS-PDSCH through which said packet data is retransmitted, by an amount corresponding to the number of times that said ACK/NACK has been consecutively detected,
wherein where said ACK/NACK has been consecutively detected n times, said transmission power of said HS-SCCH is decreased by a predetermined value,
wherein where said ACK/NACK has been consecutively detected n+m times, said transmission power of said HS-SCCH is decreased by a first multiple of said predetermined value, said first multiple being greater than one,
wherein where said ACK/NACK has been consecutive detected n+m+k times, said transmission power of said HS-SCCH is decreased by a second multiple of said predetermined value, said second multiple being greater than said first multiple,
wherein where said DTX has been detected, said transmission power of said HS-SCCH is increased by said predetermined value,
and wherein where k, m, and n are positive integers, and n is greater than one.

3. The base station according to claim 2,
wherein said decision unit increases said transmission power of said HS-SCCH in a case where said DTX inserted in said HARQ-ACK information is detected.

4. A method of controlling transmission power to be applied to a mobile communication system in which a base station transmits to a terminal packet data for HSDPA (high speed downlink packet access) through a HS-PDSCH (high speed physical downlink shared channel) and decode information for decoding said packet data of said HS-PDSCH through a HS-SCCH (high speed shared control channel), and said terminal transmits to said base station decoding status of said HS-PDSCH through a HS-DPCCH (high speed dedicated control channel), a sub-frame of said HS-DPCCH including HARQ-ACK (hybrid automatic repeat request acknowledgement) information in which said decoding status of said HS-PDSCH is indicated by ACK (acknowledgement)/NACK (negative acknowledgement)/DTX (discontinuous transmission), comprising:

causing said base station to detect said decoding status of said HS-PDSCH from said HS-DPCCH received from said terminal;

causing said base station to count a number of times that said ACK/NACK inserted in said HARQ-ACK information has been consecutively detected based on a detection result; and causing said base station to decrease said transmission power of said HS-SCCH constituting a pair with said HS-PDSCH through which said packet data is retransmitted, by an amount corresponding to the number of times that said ACK/NACK has been consecutively detected, wherein where said ACK/NACK has been consecutively detected n times, said transmission power of said HS-SCCH is decreased by a predetermined value, wherein where said ACK/NACK has been consecutively detected n+m times, said transmission power of said HS-SCCH is decreased by a first multiple of said predetermined value, said first multiple being greater than one, wherein where said ACK/NACK has been consecutive detected n+m+k times, said transmission power of said HS-SCCH is decreased by a second multiple of said predetermined value, said second multiple being greater than said first multiple, wherein where said DTX has been detected, said transmission power of said HS-SCCH is increased by said predetermined value, and wherein where k, m, and n are positive integers, and n is greater than one.

5. The method according to claim 4, further comprising:

causing said base station to increase said transmission power of said HS-SCCH in a case where said DTX inserted in said HARQ-ACK information is detected.

* * * * *